(12) United States Patent
Inoue et al.

(10) Patent No.: US 8,811,418 B2
(45) Date of Patent: Aug. 19, 2014

(54) INFORMATION PROCESSING APPARATUS, INFORMATION PROCESSING METHOD, AND STORAGE MEDIUM

(75) Inventors: Hirowo Inoue, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 522 days.

(21) Appl. No.: 13/183,537

(22) Filed: Jul. 15, 2011

(65) Prior Publication Data

US 2012/0047298 A1 Feb. 23, 2012

(30) Foreign Application Priority Data

Aug. 18, 2010 (JP) ................................. 2010-183384

(51) Int. Cl.
*G06F 13/36* (2006.01)

(52) U.S. Cl.
USPC .......................................................... 370/413

(58) Field of Classification Search
USPC .................................................. 370/412, 413
See application file for complete search history.

(56) References Cited

U.S. PATENT DOCUMENTS

| | | | |
|---|---|---|---|
| 4,903,124 A | 2/1990 | Hoshi et al. | 358/133 |
| 5,107,519 A | 4/1992 | Ishikawa | 375/27 |
| 5,666,484 A | 9/1997 | Orimo et al. | 395/182.16 |
| 5,911,056 A | 6/1999 | Faget et al. | 395/309 |
| 6,889,284 B1 * | 5/2005 | Nizar et al. | 710/315 |

FOREIGN PATENT DOCUMENTS

| | | | |
|---|---|---|---|
| JP | 63-247858 A | | 10/1988 |
| JP | 1023340 A | | 1/1989 |
| JP | 2-171975 A | | 7/1990 |
| JP | 6-46413 A | | 2/1994 |
| JP | 7-325800 A | | 12/1995 |
| JP | 2518293 | B2 | 7/1996 |
| JP | 2734246 | B2 | 3/1998 |
| JP | 2834210 | B2 | 12/1998 |
| JP | 3880724 | B2 | 2/2007 |
| JP | 3907471 | B2 | 4/2007 |
| JP | 4359490 | B2 | 11/2009 |

* cited by examiner

*Primary Examiner* — Melvin Marcelo
(74) *Attorney, Agent, or Firm* — Fitzpatrick, Cella, Harper & Scinto

(57) ABSTRACT

An information processing apparatus which circulates a packet in one way among a plurality of modules connected in a ring shape, and transmits/receives the packet, each of the plurality of modules comprising a determination unit to determine whether data contained in the packet is processing-data to be processed by a processing-module of the module or configuration data for changing settings of the processing-module by an internally contained command, a discrimination unit to discriminate, when the data is determined to be the configuration data, a command type indicating the type of command contained within the configuration data as a write-mode in which the configuration data is written in the module, a read-mode in which currently set configuration data held in the module is read out, or an exchange-mode in which the currently set configuration data is read out, and then the configuration data is written, a decision unit to decide a packet transmission interval based on the command type.

13 Claims, 14 Drawing Sheets

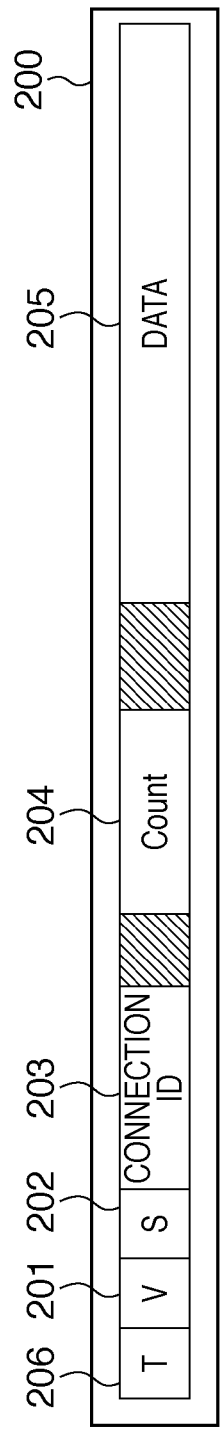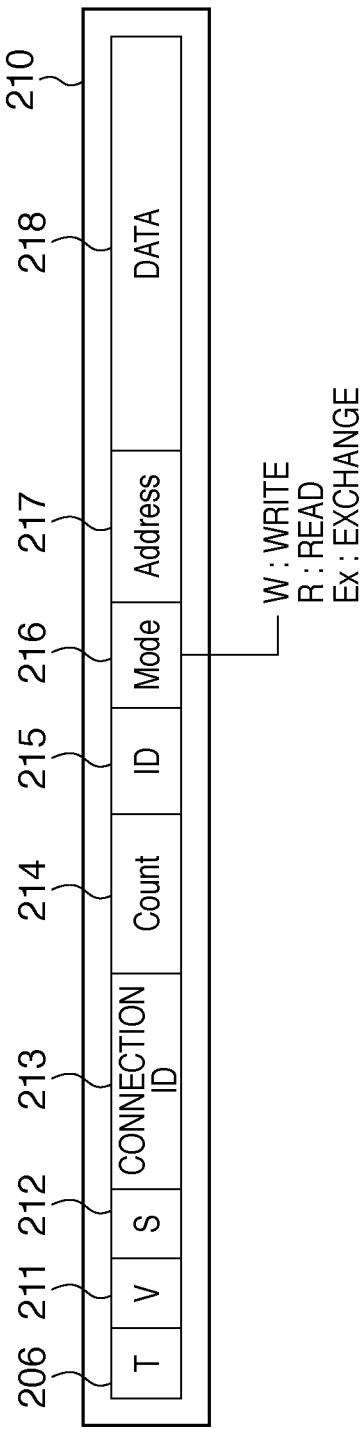

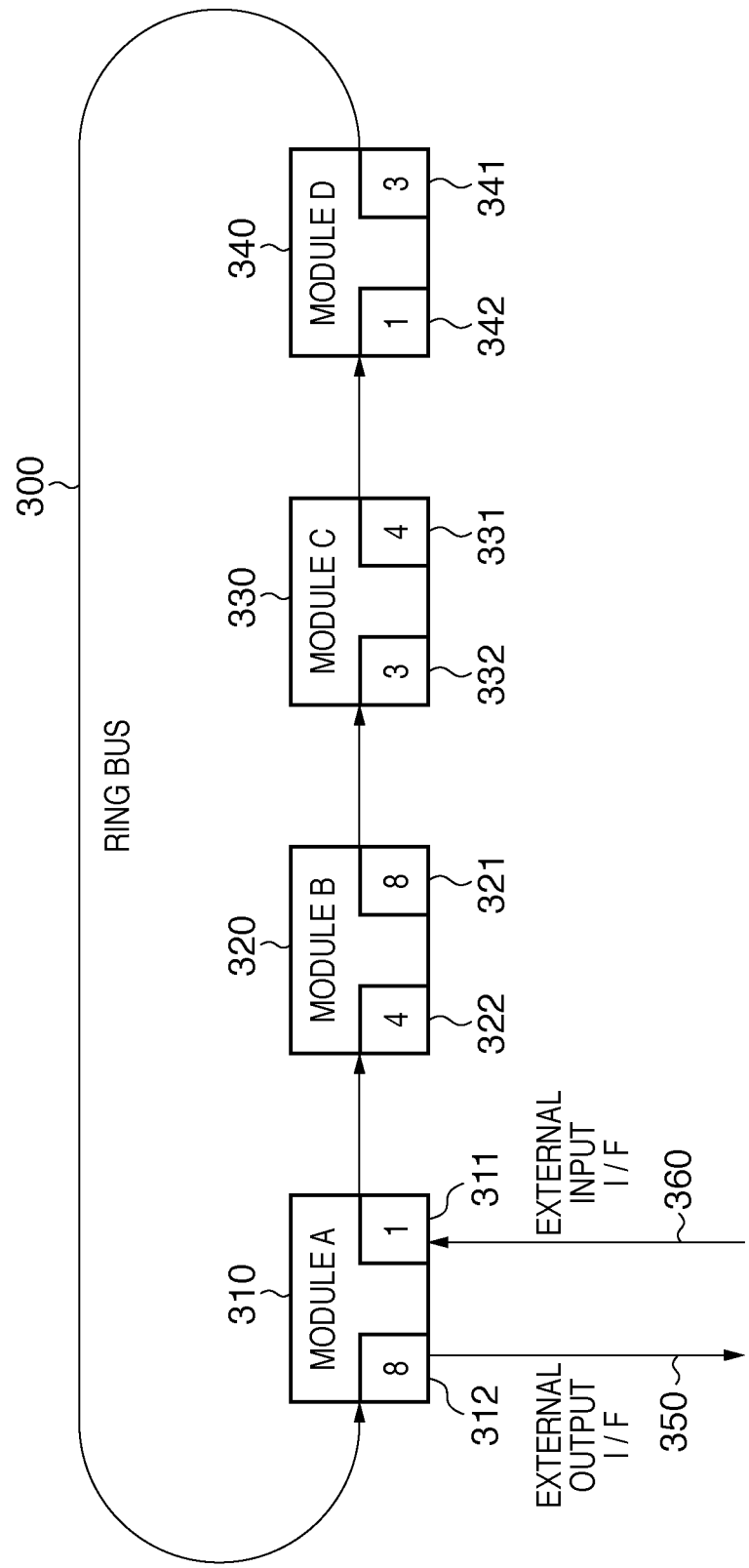

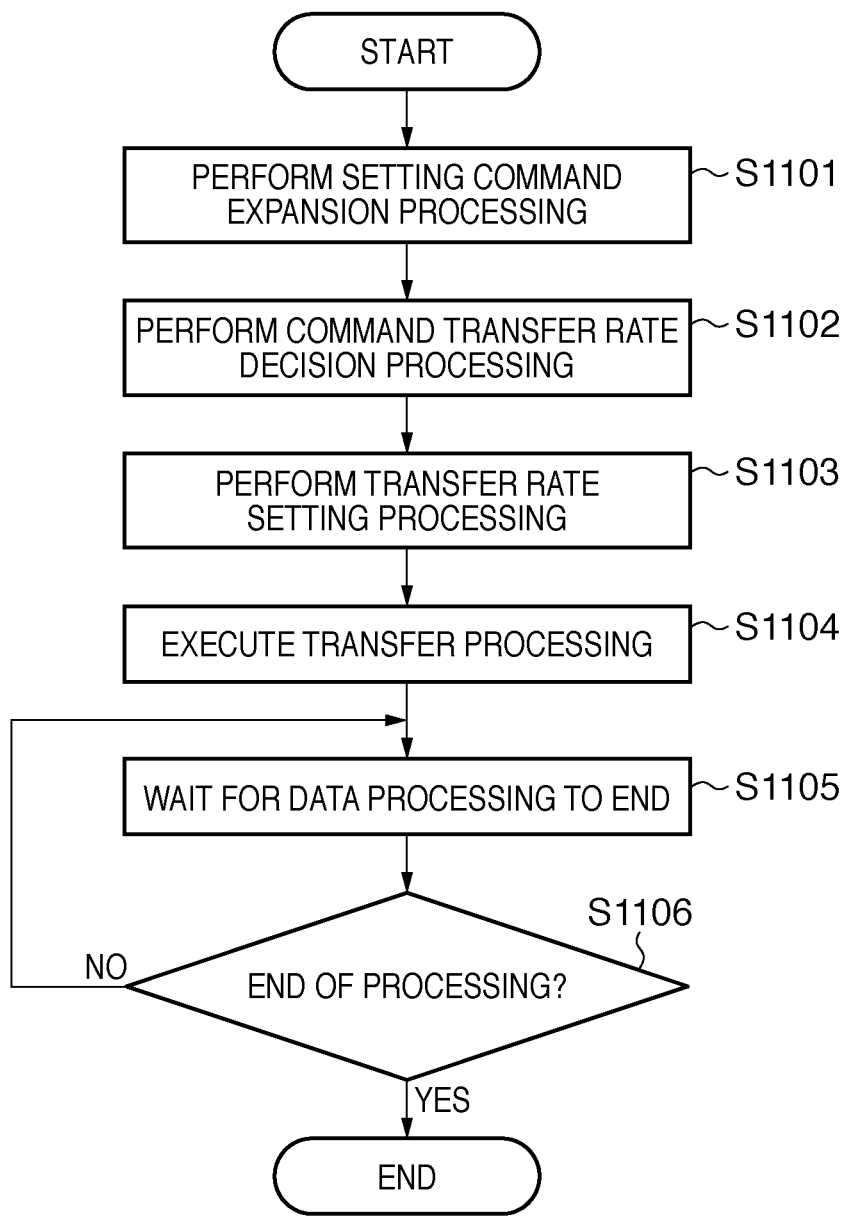

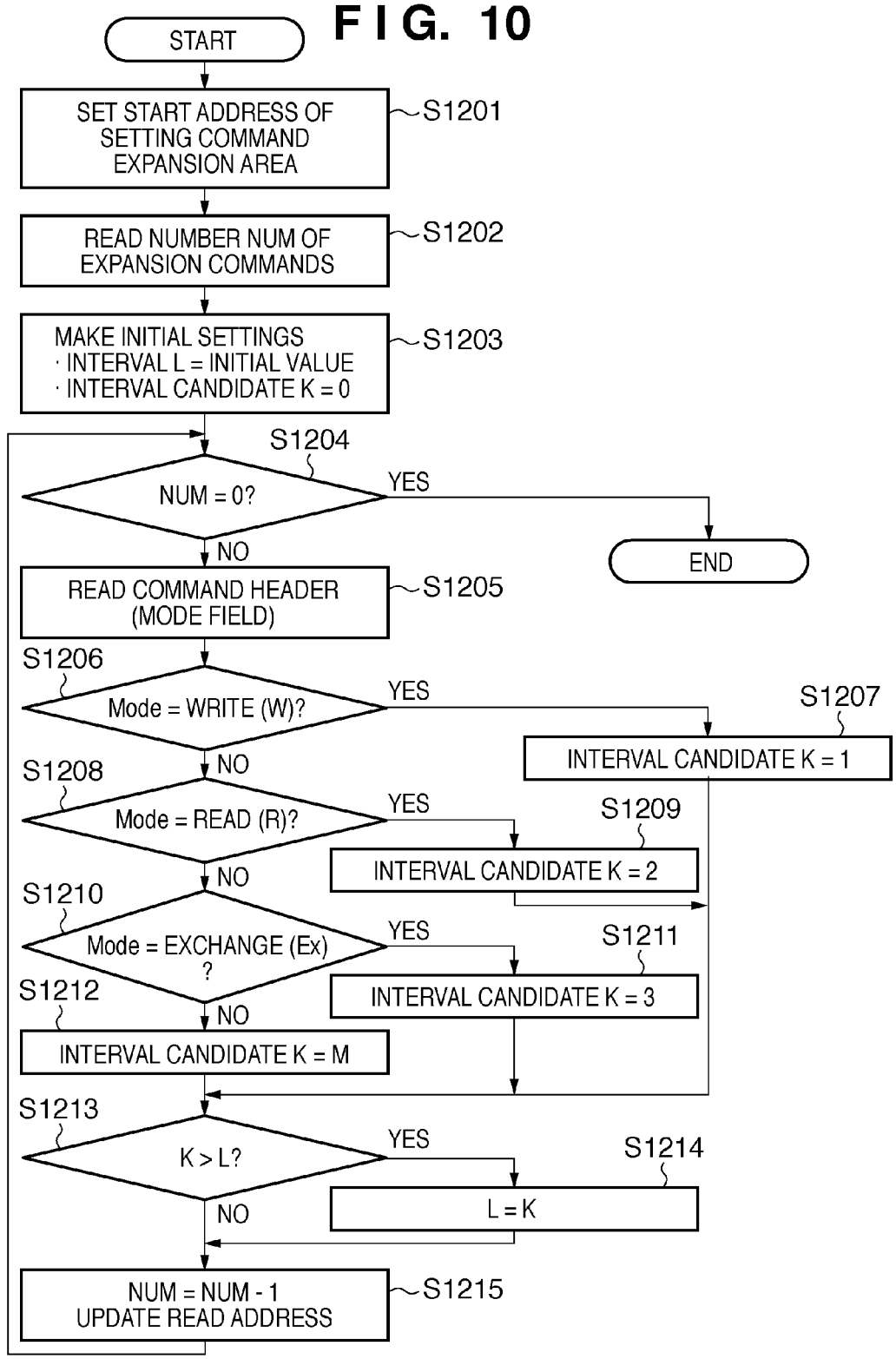

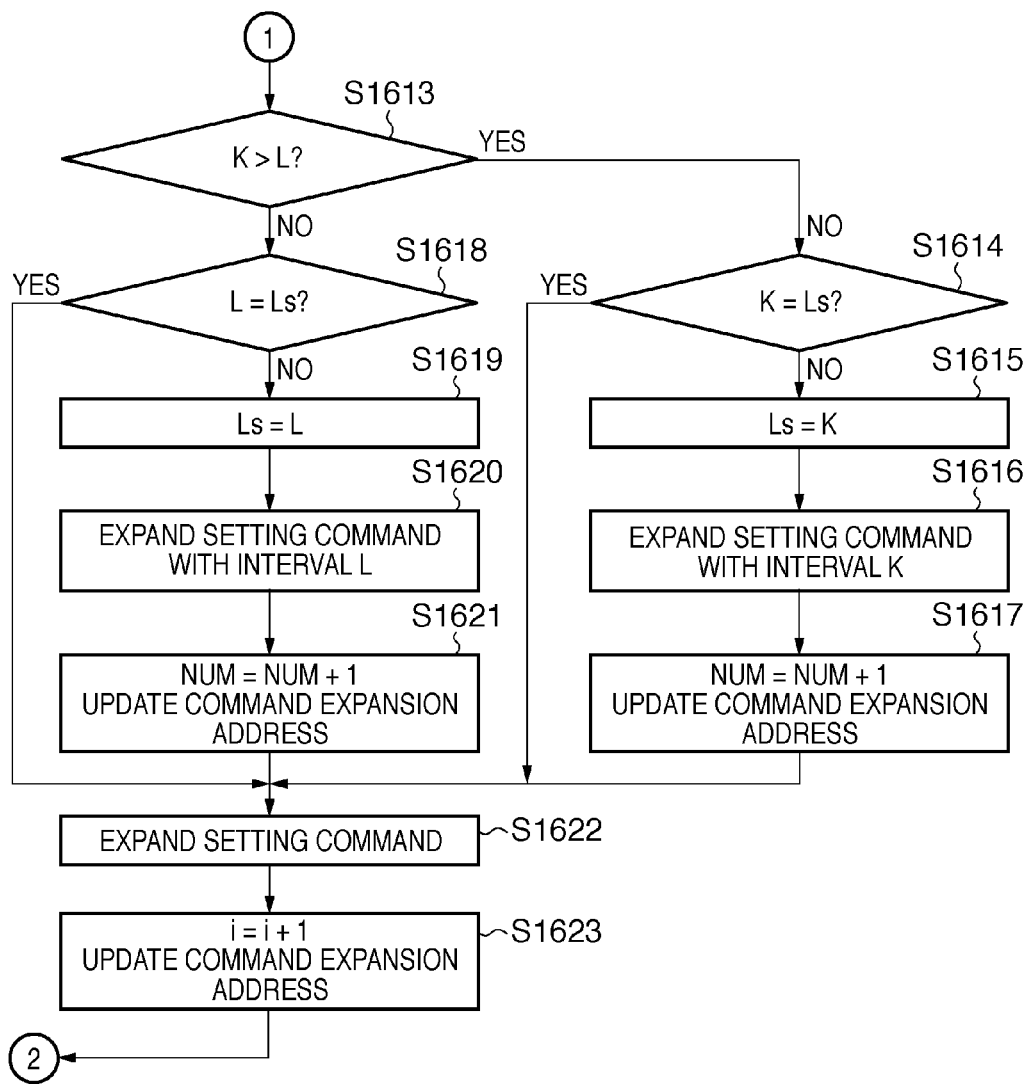
F I G. 14B

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, information processing method, and storage medium and, more particularly, a data-driven information processing apparatus, information processing method, and storage medium.

2. Description of the Related Art

An example of conventional methods of efficiently processing data through parallel execution of processing circuits implemented by hardware components is a bus pipeline connection method (see, for example, Japanese Patent No. 2734246).

According to this connection method, data input to an input terminal from an external memory via an I/F is processed in a connection order, and then output to an external memory or the like from an output terminal. The processing order is, therefore, limited by the order in which the hardware components are connected when implementing them in advance, and it is impossible to process the data in an arbitrary processing order including order swapping.

To solve the above problem, a method of connecting processing circuits by a ring bus is disclosed (see, for example, Japanese Patent Laid-Open No. 01-023340 and Japanese Patent Nos. 2834210 and 2518293).

As a technique for performing filter processes of images in parallel, there is provided a method of adding a control code to data, sending the data to a ring bus, and receiving the data in accordance with the control code. This enables a plurality of processors to receive data of an overlapping portion (see, for example, Japanese Patent Laid-Open No. 63-247858).

The following method is also disclosed. That is, to reduce a decrease in processing speed due to a bus conflict while allowing the configuration of image processing to be readily changed, a plurality of image processing units and an (input/output) control unit are connected in a ring shape. Data are packetized, and then transferred in one way on the ring bus (see, for example, Japanese Patent No. 03907471).

Furthermore, the following method is proposed. That is, to implement a high communication bandwidth, a pipelined computer graphics system has a bus structure in which graphics processing elements are coupled in a ring shape. Each graphics processing element has a core processing unit and an interface unit which are coupled to receive a command and an information signal from a preceding processing element in the ring, and send information to a succeeding processing element in the ring. The above ring bus has a clock signal (CLK), a buffered information ready signal (B_Rdy), an un-buffered information ready signal (U_Rdy), a busy signal (Busy), a type field signal (Type[8:0]), and an information field signal (Info[31:0]). The clock signal (CLK), type field signal (Type[8:0]), and information field signal (Info[31:0]) are sent downstream on the ring. On the other hand, the buffered information ready signal (B_Rdy), the un-buffered information ready signal (U_Rdy), and the busy signal (Busy) are supplied upstream on the ring (see, for example, Japanese Patent No. 03880724).

A data overflow occurs when the data traffic amount exceeds an upper limit of an amount of data circulating on the ring bus. As a method of avoiding such a data overflow, there is disclosed a technique for inserting a delay packet, temporarily saving data from the ring bus, or suppressing output to the ring bus (see, for example, Japanese Patent Laid-Open No. 2-171975 or 7-325800).

Moreover, a memory access conflict occurs when processors which are connected with a ring bus and operate independent of each other intensively access processing data, reference data, and the like in a shared memory. To avoid such a memory access conflict, there is proposed a technique in which each processor has a local distributed memory including a two-port memory, and data necessary for processing are transmitted/collected to/in the memory, as needed (see, for example, Japanese Patent Publication No. 6-46413).

On the other hand, there is also disclosed a technique for writing (W) or reading (R) internal data by issuing a command for a storage unit connected to each distributed processor instead of using a two-port memory (see, for example, Japanese Patent No. 4359490).

Conventionally, however, configuration data such as setting parameters and processing data such as image data are not separated in a distributed internal memory (or register) of each processor placed on a ring bus.

On the other hand, in recent hardware implementation, many parameters may be needed to increase the degree of freedom of image processing. An increase in number of parameters decreases the performance of the image processing. Therefore, transfer of such setting parameters at high speed presents a problem.

Japanese Patent Laid-Open No. 2-171975 does not disclose a control method when writing/reading data or setting parameters in/from a distributed internal memory (or register).

Consider an image processing apparatus in which a plurality of processors are connected by a single ring bus for distributing data in one way. In this case, in configuration data processing for a distributed memory (or register) which is included in each processor connected to the ring bus, and holds setting values and the like, it is essential to time-divisionally multiplex and transfer the setting values and the like together with processing data such as image data. The configuration data processing includes write (W) processing, read (R) processing, and exchange (Ex) processing. If there exists a data packet which a processor cannot receive because it is busy, a stall bit is set for the data packet, and the data packet circulates on the ring bus. It is known that if the number of packets circulating on the ring bus exceeds a certain number, a deadlock occurs in which it is impossible to input data to the ring bus or extract data from the ring bus.

To avoid such a deadlock, image processing target data should be controlled to be input at appropriate speed. The appropriate speed should be determined in consideration of the image processing speed of a processor used for the processing, and packet traffic which circulates on the ring bus due to a change in processing order. The same goes for configuration data, and image processing target data should be controlled to be input at speed depending on the read/write processing speed for a distributed memory (or register) of each processor.

In fact, image data may have a large amount in the case of high-resolution print image processing, or may have a small amount in the case of preview image generation processing which processes an extremely small number of pixels such as 160×120 pixels. In this processing, for example, when a one-dimensional lookup table (to be referred to as "LUT1D" hereinafter) for 10-bit R, G, and B input data is set before executing the processing, it is necessary to transfer configuration data of 1024 entries×3 colors=3072 entries. This data amount makes up 16% of a total processing data amount. If there are two LUT1Ds, their data amount makes up 30% of the total processing data amount. A large configuration data amount has a large influence on the total processing amount.

In such situation, as disclosed in, for example, Japanese Patent Laid-Open No. 7-325800, a technique for suppressing data transmission for a specified period of time is proposed. However, it is generally possible to process configuration data at high speed as compared with processing data. In this technique, the configuration data are processed at low speed for the processing data, and it is thus actually impossible to obtain the setting processing speed.

As described above, the conventional techniques cannot control a configuration data transfer rate independently of an image data transfer rate prior to image processing, and therefore cannot fully exploit the actual processing performance.

In consideration of the above problems, the present invention provides a technique for controlling a configuration data transfer rate independently of an image data transfer rate prior to image processing, and executing the processing at higher speed.

SUMMARY OF THE INVENTION

According to one aspect of the present invention, there is provided an information processing apparatus which circulates a packet in one way among a plurality of modules connected in a ring shape, and transmits and receives the packet, each of the plurality of modules comprising a reception unit adapted to receive the packet, a determination unit adapted to determine whether data contained in the packet received by the reception unit is processing data to be processed by a processing module of the module or configuration data for changing settings of the processing module by an internally contained command, a discrimination unit adapted to, at least, discriminate, when the determination unit determines that the data contained in the packet is the configuration data, a command type indicating a type of command contained within the configuration data as a write mode in which the configuration data is written in the module, a read mode in which currently set configuration data held in the module is read out from the module, or an exchange mode in which the currently set configuration data is read out from the module, and then the configuration data is written in the module, a decision unit adapted to decide a packet transmission interval from the module based on the command type discriminated by the discrimination unit, a setting unit adapted to set, in a timer, the packet transmission interval decided by the decision unit, and a transmission unit adapted to transmit the packet at the packet transmission interval set in the timer by the setting unit.

Further features of the present invention will be apparent from the following description of exemplary embodiments with reference to the attached drawings.

BRIEF DESCRIPTION OF THE DRAWINGS

FIGS. 2A and 2B are views each showing a field structure example of a packet flowing on a ring bus;

FIG. 3 is a view showing a configuration example of the ring bus;

FIG. 9 is a flowchart illustrating a setting processing procedure in command expansion processing;

FIG. 10 is a flowchart illustrating a setting command search processing procedure;

FIGS. 14A and 14B are flowcharts illustrating a processing procedure for deciding a transfer rate while expanding a command.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
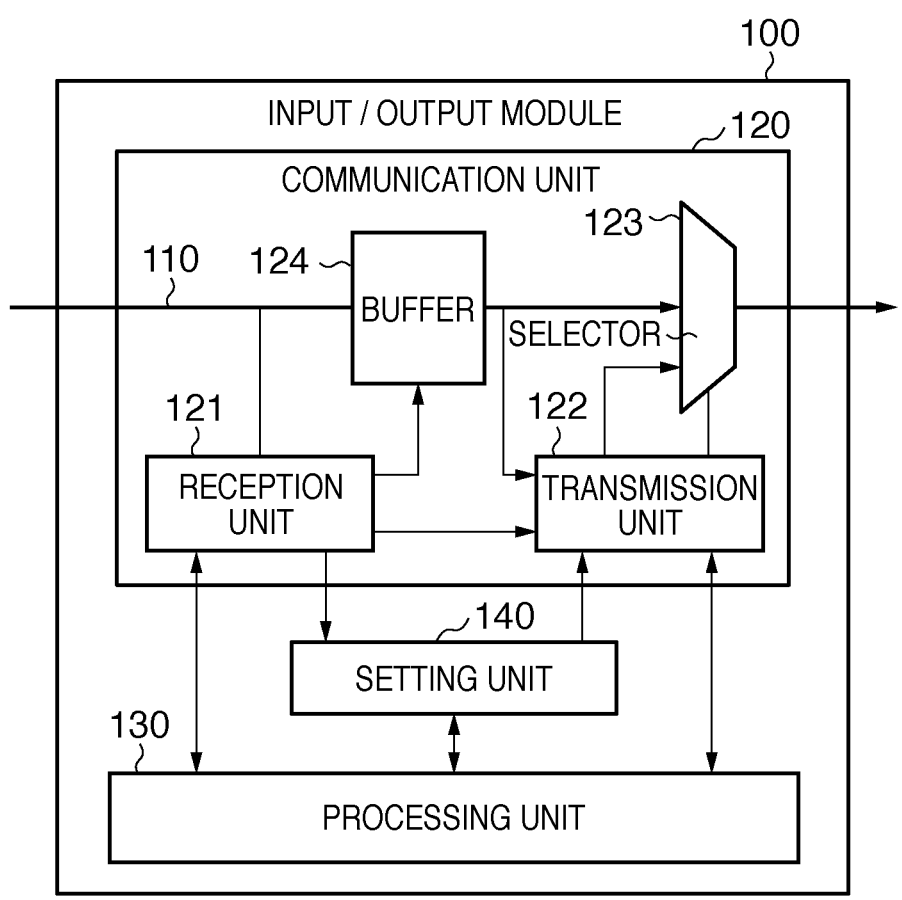
FIG. 1 is a block diagram showing a configuration example of a module of an information processing apparatus.

With reference to FIG. 1, a configuration example of a module of an information processing apparatus according to the present invention will be explained. A module 100 is a single module connected to a ring bus 110. The module 100 includes a communication unit 120, a processing unit 130, and a setting unit 140. The ring bus 110 connects modules 100 in a ring shape.

The communication unit 120 transmits and receives data between the module 100 and the ring bus 110, and also serves to hold data packets flowing on the ring bus 110. The communication unit 120 includes a reception unit 121, a transmission unit 122, a selector 123, and a buffer 124. Among data packets flowing on the ring bus 110, the reception unit 121 receives data to be processed by the module 100. The transmission unit 122 generates and transmits a transmission packet for data processed by the processing unit 130 or data processed by the communication unit 120. In accordance with determination of the transmission unit 122, the selector 123 selects and outputs a packet input from the ring bus 110 or the packet generated by the transmission unit 122. The buffer 124 temporarily holds the packet input via the ring bus 110.

The processing unit 130 processes the data received at the communication unit 120. The setting unit 140 holds setting parameters and data referred to or changed in processing of the processing unit 130, and details of this processing will be described later. With reference to FIGS. 2A and 2B, field structure examples of a packet flowing on the ring bus 110 will be explained.

A communication path according to the present invention is a single ring bus which distributes data in one way. Therefore, processing data processed in each processor and configuration data for setting each processor are multiplexed on the same ring bus 110, and then transmitted and received. An area 200 shows a structure example of fields within the packet of the processing data. A setting command packet 210 represents a structure example of fields within the packet of the configuration data. A command type T field 206 indicates a command type. The reception unit 121 discriminates a value held in this field. If the value represents processing data, the unit 121 controls to transmit it to the processing unit 130. If the value represents configuration data, the unit 121 controls to transmit it to the setting unit 140.

With reference to FIG. 2A, the processing data packet shown in the area 200 will be explained. A valid flag 201 indicates that the packet is valid. A stall flag 202 represents that reception of the packet is stalled. A connection ID 203 identifies a logical processing order of the module 100. A count value 204 indicates a data transmission order. A data field 205 contains data to be processed.

With reference to FIG. 2B, the configuration data packet represented by the setting command packet 210 will be described. A valid flag 211 indicates that the packet is valid. A stall flag 212 represents that reception of the packet is stalled. A connection ID 213 identifies a logical processing order of the module. A count value 214 indicates a data transmission order. A setting destination module ID field 215 specifies a module 100 to be set. A MODE field 216 represents a setting processing mode, and holds a value indicating a write (W), read (R), or exchange (Ex) mode. An address field 217 specifies an internal memory or register for holding configuration data. A data field 218 contains the configuration data, which has the following meaning in accordance with the mode indicated by the MODE field 216.

In the write (W) mode, the data field 218 holds data to be written. In the read (R) mode, the data field 218 holds invalid data until the module 100 identified by the connection ID 213 is reached. Then, after the module 100 performs read processing, the data field 218 holds data stored at the address specified by the address field 217 in the internal memory or register.

In the exchange (Ex) mode, the data field 218 holds data to be written at the address specified by the address field 217 until the module 100 identified by the connection ID 213 is reached. Then, after the module 100 performs setting processing, the data field 218 holds readout data held at the address specified by the address field 217 immediately before executing write processing.

With such field structure of a packet, it is possible to construct a system only using a single ring bus which distributes data in one way, thereby keeping the number of connections among the modules to a minimum.

With reference to FIG. 3, a configuration example for configuring a ring bus 300 by connecting modules will be explained. Data is externally input to a terminal module 310 (to be also referred to as "module A" hereinafter) via a connection 360 with an external data bus. The module 310 outputs outside data undergone processing in other modules on the ring bus 300 via a connection 350 with an external data bus. A module 320 (to be also referred to as "module B" hereinafter), a module 330 (to be also referred to as "module C" hereinafter), and a module 340 (to be also referred to as "module D" hereinafter) are connected to the ring bus 300. Each module may perform different types of processing, or some modules may execute the same processing. The ring bus 300 including the four modules is exemplified here. The number of modules constituting the ring bus 300 is not particularly limited, and a larger or smaller number of modules may constitute the ring bus 300.

Such configuration of the ring bus 300 allows data to circulate on the ring bus 300 in an order different from a connection order, and the modules to execute data processing. For example, consider a case in which modules A, D, C, and B sequentially perform processing in the order named.

A connection ID value "1" is set to a transmission ID 311 of module A and a reception ID 342 of module D. A connection ID value "3" is set to a transmission ID 341 of module D and a reception ID 332 of module C. A connection ID value "4" is set to a transmission ID 331 of module C and a reception ID 322 of module B. A connection ID value "8" is set to a transmission ID 321 of module B and a reception ID 312 of module A. With these settings, it is possible to specify a processing order.

While being processed in each module in accordance with the settings, the processing data circulates on the ring bus 300 like A→D→C, C→B, and B→A, and is then output. In this situation, when a next packet reaches a certain busy module, the module cannot process the packet. The module, therefore, does not accept the received packet, changes the stall flag 202 or 212 of the packet to "valid", and transmits the packet to the ring bus 300. If packets are input to the ring bus at a speed higher than the module processing speed, the ring bus 300 is filled with packets having the stall flag 202 or 212 set with "valid", thereby making it impossible to input a packet anymore. Since the same goes for any busy module, it is impossible to input a processed packet to the ring bus 300, and a so-called deadlock occurs in which data cannot be input or output. For setting commands (to be described later), unless packets are input at intervals suitable for setting a command processing speed, a deadlock occurs.

Figure 4:
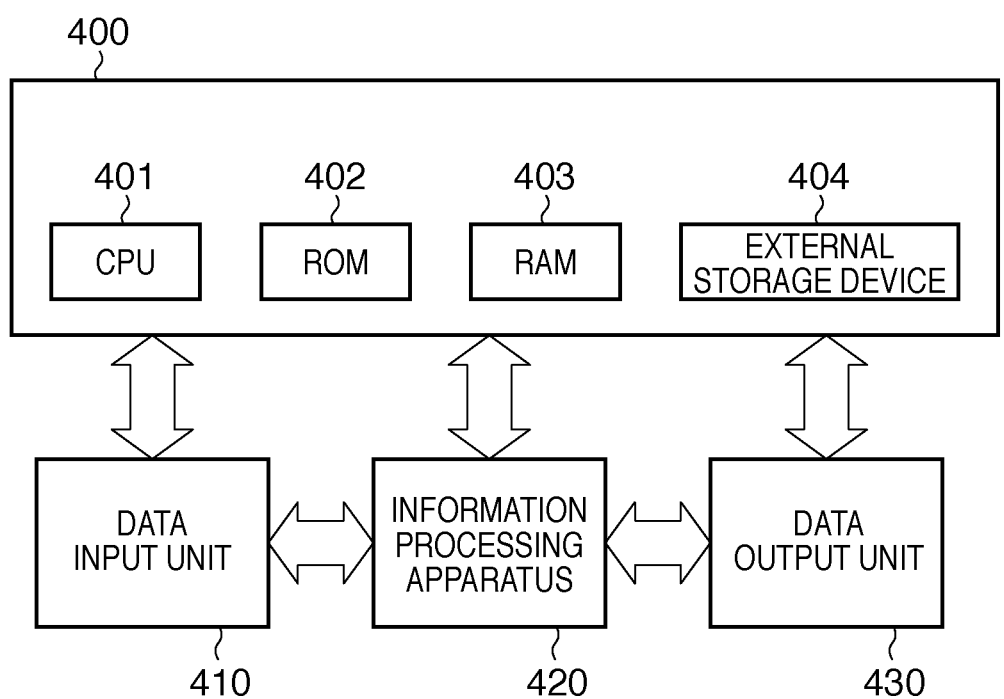
FIG. 4 is a block diagram showing a system configuration example.

With reference to FIG. 4, a configuration example of a system in which an information processing apparatus 420 according to the present invention is arranged will be described. A system control unit 400 includes a CPU 401, a ROM 402, a RAM 403, and an external storage device 404. The CPU 401 controls various operations. The ROM 402 stores fixed data and programs. The RAM 403 is used for temporarily storing data or loading a program. The external storage device 404 stores and holds external data.

Data to be processed is input to a data input unit 410 from outside the system. The data input unit 410 may serve as, for example, an image reading apparatus including devices such as an image scanner and A/D converter, or an audio input apparatus including devices such as a microphone and A/D converter. The information processing apparatus 420 is an information processing apparatus according to the present invention.

A data output unit 430 outputs outside the data processed in the system. The data output unit 430 may serve as, for example, an image output apparatus including a printer device for converting image data into a print dot pattern and outputting the converted data, or an audio output apparatus for outputting audio data through a D/A converter and the like.

Data input to the data input unit 410 may be transmitted to the system control unit 400, and processed by the CPU 401, or may be temporarily recorded on the RAM 403 or external storage device 404 intact. The information processing apparatus 420 may receive input data directly from the data input unit 410 to perform processing, or read out data temporarily accumulated in the RAM 403 to perform processing in response to an instruction from the system control unit 400. Similarly, data output from the information processing apparatus 420 may be sent to the system control unit 400 again, or may be directly sent to the data output unit 430 to perform output processing. Under control of the system control unit 400, the information processing apparatus 420 operates by being set with various data processing contents, and being supplied with processing data.

Figure 5A:
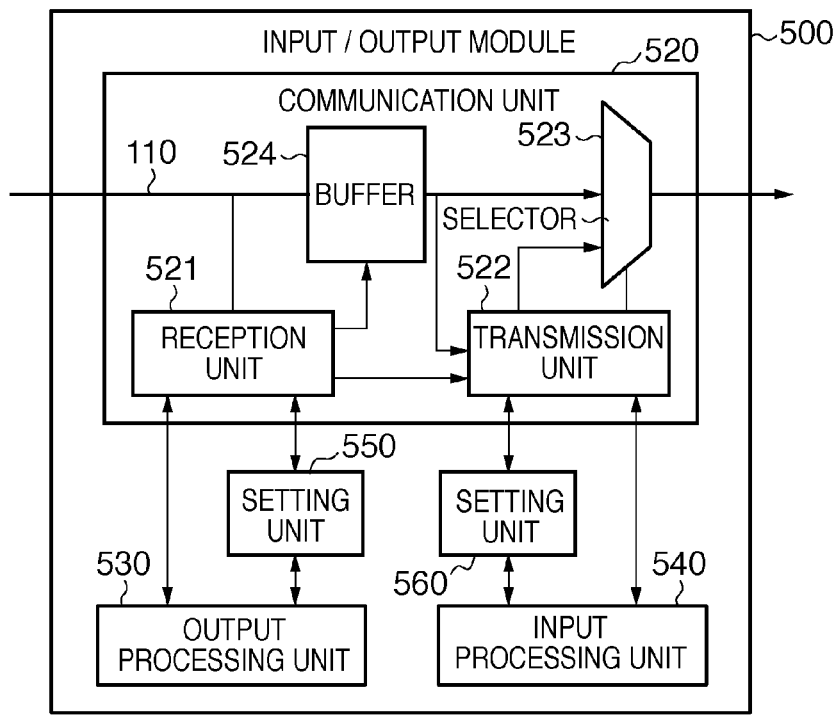
FIG. 5A is a block diagram showing a configuration example of an input/output module.

With reference to FIG. 5A, a configuration example of an input/output module will be explained. An input/output module 500 that inputs/outputs data to/from an external memory is different from other processing modules constituting the ring bus 110.

A communication unit 520 transmits and receives data between the input/output module 500 and the ring bus 110, and also serves to hold data packets flowing on the ring bus 110. The communication unit 520 has a reception unit 521, a transmission unit 522, a selector 523, and a buffer 524. The reception unit 521 receives a packet transferred from the ring bus 110. The transmission unit 522 transmits a packet to the ring bus 110. The selector 523 selects to output data from the ring bus 110 or data input to the input/output module 500 in accordance with the contents of a packet. The buffer 524 temporarily holds packets flowing on the ring bus 110.

In the following description, assume that the ring bus 110 is a parallel communication path which can transfer one data packet in one clock cycle. The ring bus 110, however, may be a serial communication path which transfers packet data in a clock by a small number of bits.

An output processing unit 530 outputs outside data from the ring bus 110. An input processing unit 540 inputs unprocessed data to the ring bus 110. A setting unit 550 sets and holds operation setting values and the like for the output processing unit 530. A setting unit 560 sets and holds operation setting values and the like for the input processing unit 540.

Using the input/output module 500 with such a configuration, data is input/output to/from the ring bus 110. FIG. 5A shows a configuration example where it becomes easy to control synchronization between input and output by connecting the input/output module 500 to one communication path. The present invention is not necessarily limited to this configuration, and a configuration including a module whose communication unit 520 is connected to the input processing unit 540 and a module whose communication unit 520 is connected to the output processing unit 530 is also applicable. In this case, neither the output processing unit 530 nor the setting unit 550 exists in the input module. On the other hand, neither the input processing unit 540 nor the setting unit 560 exists in the output module.

Figure 5B:
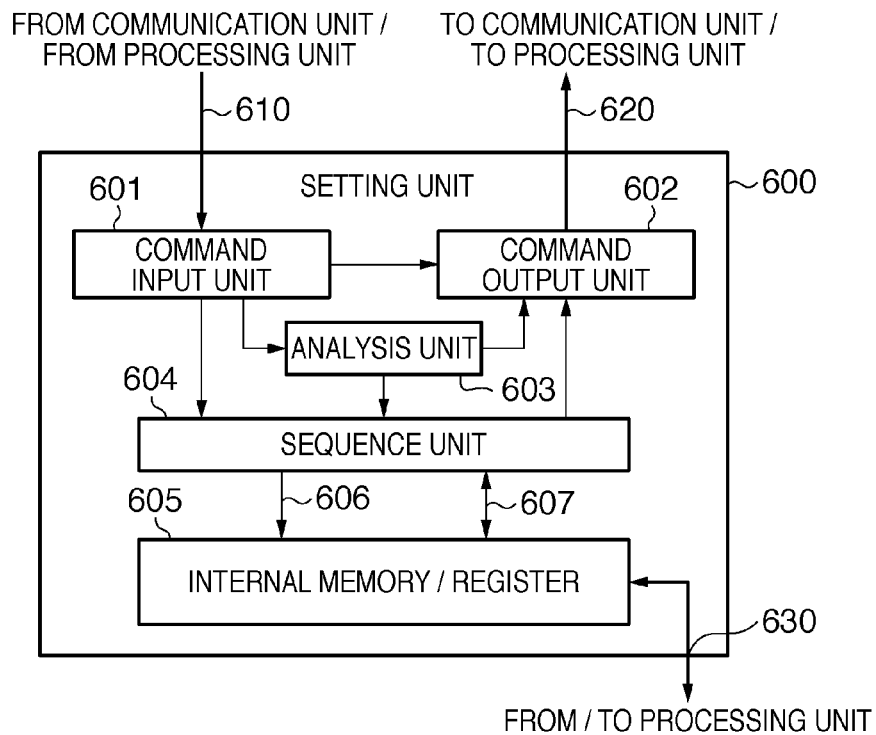
FIG. 5B is a block diagram showing a configuration example of a setting unit.

With reference to FIG. 5B, a configuration example of the setting unit in FIG. 1 or 5A will be explained. A setting unit 600 corresponds to the setting unit 140 in FIG. 1, or the setting unit 550 or 560 in FIG. 5A.

The setting unit 600 includes a command input unit 601, a command output unit 602, an analysis unit 603, a sequence unit 604, an internal memory/register 605, an address communication path 606, and a data communication path 607. The command input unit 601 accepts a setting command from the communication unit 120 or input processing unit 540. The command output unit 602 outputs a processed setting command to the communication unit 120 or 520. In this example, an analysis result of the analysis unit 603 (to be described later) is referred to. If a command type indicating the type of input command represents a write (W) command, the command received from the command input unit 601 is output intact. Alternatively, if the input command is a read (R) or exchange (Ex) command, readout data received from the sequence unit 604 (to be described later) is stored in the command received from the command input unit 601, and then the obtained command is output. The analysis unit 603 analyzes the type of input command.

The analysis unit 603 analyzes the contents of the MODE field 216 within the command packet. The internal memory/register 605 holds a setting value, processing data, or the like for each module. In accordance with the analysis result of the analysis unit 603, the sequence unit 604 performs write (W), read (R), or exchange (Ex) access sequence control for the internal memory/register 605. The address communication path 606 sends the address field 217 of the setting command packet 210 received from the command input unit 601.

The data communication path 607 communicates data between the sequence unit 604 and the internal memory/register 605. If the analysis result of the analysis unit 603 indicates a write (W) command, the value held in the data field 218 is written in the internal memory/register 605. If the analysis result of the analysis unit 603 indicates a read (R) command, the address data (currently set configuration data) received through the address communication path 606 is read out. Alternatively, if the analysis result indicates an exchange (Ex) command, in addition to reading out the address data received through the address communication path 606, the value held in the data field 218 is written.

A communication path 610 is used to input a command to the setting unit 600. The command is transmitted from the communication unit 120 to the setting unit 140 in FIG. 1. The command is transmitted from the input processing unit 540 to the setting unit 560 in FIG. 5A. On the other hand, a communication path 620 is used to output a command processed by the setting unit 600. Referring to FIG. 1, the command is output to the communication unit 120. Referring to FIG. 5A, while the setting unit 560 on the input unit side outputs the command to the communication unit 520, the setting unit 550 on the output unit side outputs the command to the output processing unit 530.

A communication path 630 is used to notify the processing unit 130, output processing unit 530, or input processing unit 540 of the contents of the internal memory/register 605 set by the setting unit 600. The communication path 630 is also used to record data from the processing unit 130, output processing unit 530, or input processing unit 540.

As shown here, the internal memory/register 605 may record not only a setting value from outside using a setting command packet but also hold a result processed in the processing unit 130 or the like to be readable by a command. After setting an initial value in the internal memory/register 605 in advance by a setting command, an operation of referring to the internal memory/register 605 in processing a subsequently input processing data packet, and returning the setting value changed in the processing may be performed.

Consider, for example, a case in which the number of occurrences, that is, a histogram with respect to pixel values in image A is obtained. In this case, a command is input to write, as an initial value, "0" in the whole histogram holding area of the internal memory/register 605. After that, while sequentially processing image data, the processing unit 130 accumulates the number of occurrences in the internal memory/register 605. When all pixels in image A are processed, a command is input to sequentially read out the number of occurrences accumulated in the internal memory/register 605.

In this processing, the setting unit 600 accesses the internal memory/register 605 to write the initial value and read out a processed histogram by an externally input command, and the processing unit 130 performs read modify write access for the internal memory/register 605 through the communication path 630.

Figure 6A:
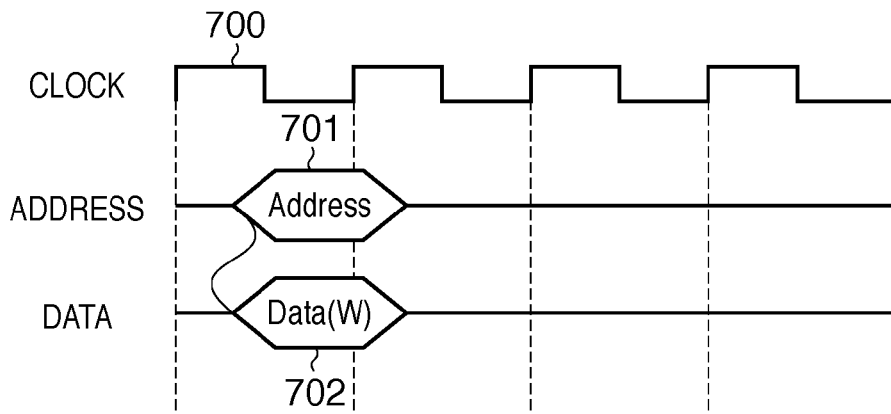
FIGS. 6A to 6C are timing charts each showing an internal memory/register write sequence by setting commands.
Figure 6B:
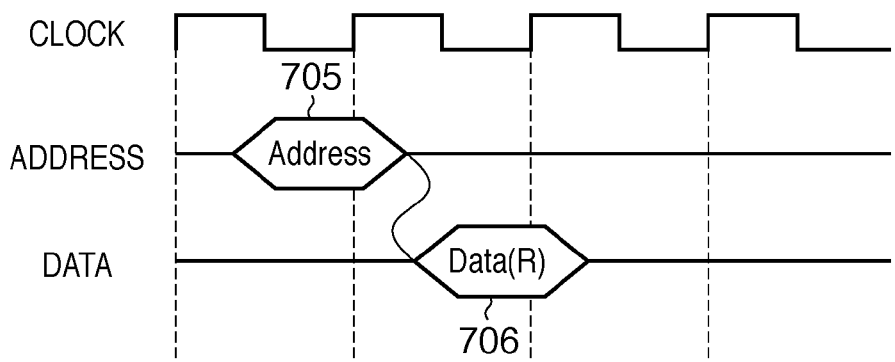
Figure 6C:
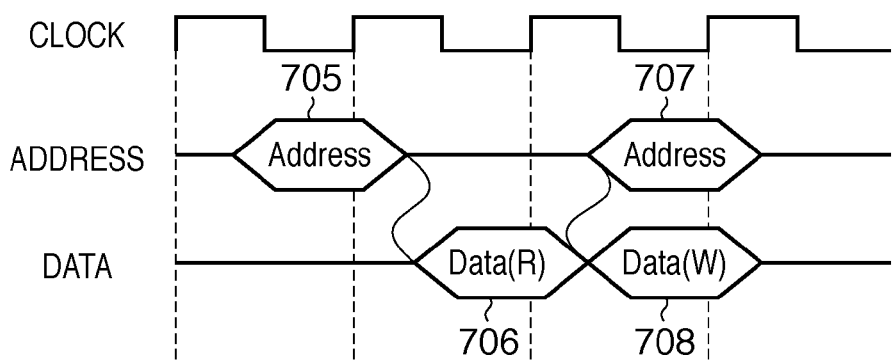

With reference to FIGS. 6A to 6C, access sequences performed by the sequence unit 604 for the internal memory/register 605 in accordance with the contents of the MODE field 216 of the setting command packet 210 will be described.

FIG. 6A shows a sequence when the MODE field indicates a write (W) mode. In this case, the internal memory/register 605 is notified of an address 701 and write data 702 in the first clock after the command is input, and then the process ends. That is, the write (W) command terminates the processing in one cycle.

FIG. 6B shows a sequence when the MODE field indicates a read (R) mode. In this case, a read address 703 is issued in the first clock after the command is input. The internal memory/register 605 decodes the address, returns data 704 in a corresponding area in the second clock, and then ends the processing. That is, the read (R) command terminates the processing in two cycles.

FIG. 6C shows a sequence when the MODE field indicates an exchange (Ex) mode. In this case, a read address 705 is issued in the first clock after the command is input. The internal memory/register 605 decodes the address, and returns data 706 in a corresponding area in the second clock. In the third clock, the internal memory/register 605 is notified of, together with an address 707 (whose address value is the same as that of the address 705), data 708 carried by the command, and records them. The exchange (Ex) command thus terminates the processing in three cycles.

Since the processing speed of a setting command varies depending on the type of command, that is, a write (W), read (R), or exchange (Ex) command, it is necessary to control input intervals (packet transmission intervals) to conform to the processing speed in terms of the number of clocks. If, for the sake of security, transfer is performed at three-cycle intervals to conform to the exchange (Ex) command whose processing speed is lowest, the processing time of the write command which can be processed in one cycle becomes threefold.

A parameterized design method and the like increase the amount of program data or setting information of a hardware component or processor. It is impossible to fully exploit the actual performance of the processor unless the overhead in setting processing decreases. It is necessary to perform speed control in accordance with the mode of a setting command.

Figure 7A:
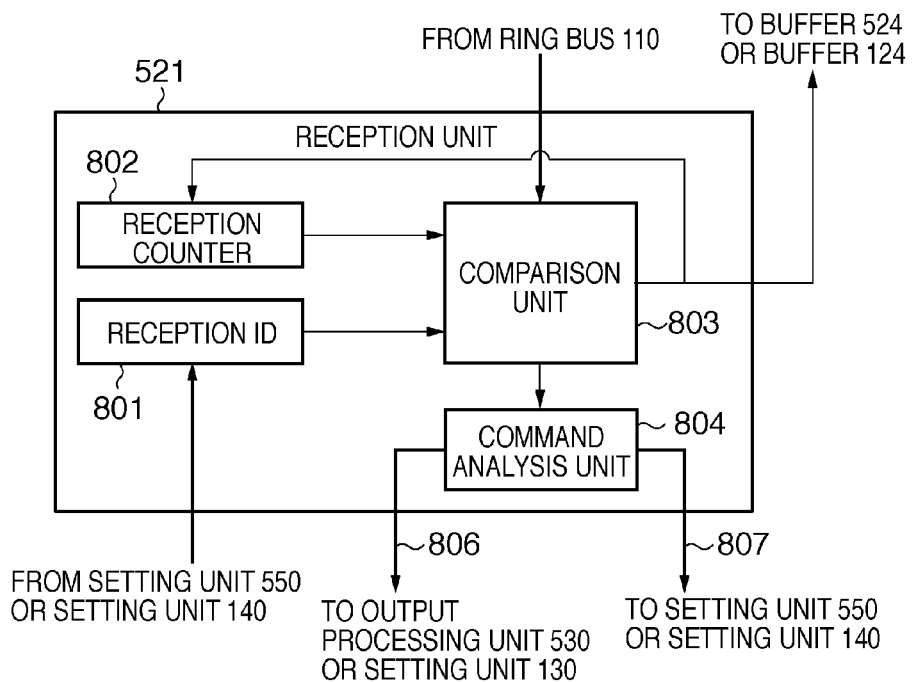
FIG. 7A is a block diagram showing a configuration example of a reception unit.

With reference to FIG. 7A, a configuration example of the reception unit 121 in FIG. 1 or the reception unit 521 in FIG. 5A will be explained. The reception unit 521 (or the reception unit 121) includes a reception ID unit 801, a reception counter 802, a comparison unit 803, and a command analysis unit 804.

The reception ID unit 801 refers to a reception ID held in the setting unit 550 (or the setting unit 140). The comparison unit 803 compares the valid flag 201, connection ID 203 and count value 204 of a packet on the ring bus 110 with the value referred to by the reception ID unit 801 and the value of the reception counter 802. If the valid flag 201 of the packet is "valid", the connection ID 203 of the packet coincides with the value referred to by the reception ID unit 801, and the count value 204 of the packet coincides with the value of the reception counter 802, the comparison unit 803 determines to receive the packet on the ring bus 110.

If the comparison unit 803 determines to receive the packet on the ring bus 110, it outputs packet data to the command analysis unit 804, and notifies the reception counter 802 of the determination result that the data is valid. Upon reception of the notification, the reception counter 802 updates the count value. Since the packet is received, the valid flag 201 of the packet held in the buffer 524 is reset, thereby changing the packet to a null packet.

The command analysis unit 804 refers to the command type T field 206 of the packet output from the comparison unit 803. If the field 206 indicates processing data, the unit 804 outputs the data field 205 of the packet to the output processing unit 530 or processing unit 130. Alternatively, if the field 206 represents configuration data, the unit 804 outputs the MODE field 216, address field 217, and data field 218 to the setting unit 550 or 140.

Figure 7B:
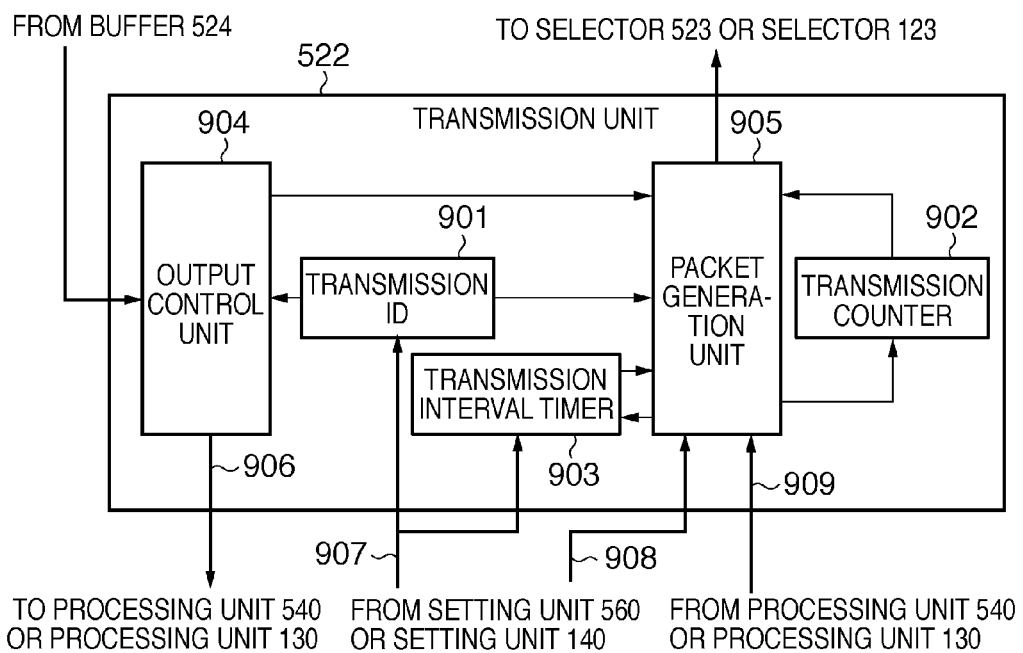
FIG. 7B is a block diagram showing a configuration example of a transmission unit.

With reference to FIG. 7B, a configuration example of the transmission unit 122 in FIG. 1 or the transmission unit 522 in FIG. 5A will be described. The transmission unit 522 (or the transmission unit 122) has a transmission ID unit 901, a transmission counter 902, a transmission interval timer 903, an output control unit 904, and a packet generation unit 905. The transmission ID unit 901 refers to a transmission ID held in the setting unit 560. The transmission interval timer 903 measures a transmission suppression period, and refers to an initial value held in the setting unit 560. A signal 906 serves as an output permission/suppression signal for the input processing unit 540 (or the processing unit 130). A signal 907 is used to read out the initial values of the transmission ID unit 901 and transmission interval timer 903 from the setting unit 560 (or the processing unit 130). An output 908 indicates an output of a setting command from the setting unit 560. An output 909 represents an output of processed data from the input processing unit 540.

The output control unit 904 compares the valid flag 201 with the stall flag 202 in the packet held in the buffer 524, and compares the connection ID 203 with the value referred to by the transmission ID unit 901. If the valid flag 201 is "valid", the input processing unit 540 (or the processing unit 130) is requested to suppress data output; otherwise, the input processing unit 540 (or the processing unit 130) is requested to permit data output since the packet is null and therefore output is possible.

If the output control unit 904 permits output to the input processing unit 540, and the input processing unit 540 performs output processing, the packet generation unit 905 receives processed data from the input processing unit 540. An output packet is generated by adding the values of the transmission ID unit 901 and transmission counter 902, validating the valid flag 201, and invalidating the stall flag 202. If the value of the transmission interval timer 903 for measuring a transmission suppression period reaches a predetermined value, the output packet is output to the selector 523 (or the selector 123). The selector 523 then outputs the output packet from the packet generation unit 905 to the ring bus 110 instead of the packet held in the buffer 524.

Figure 8A:
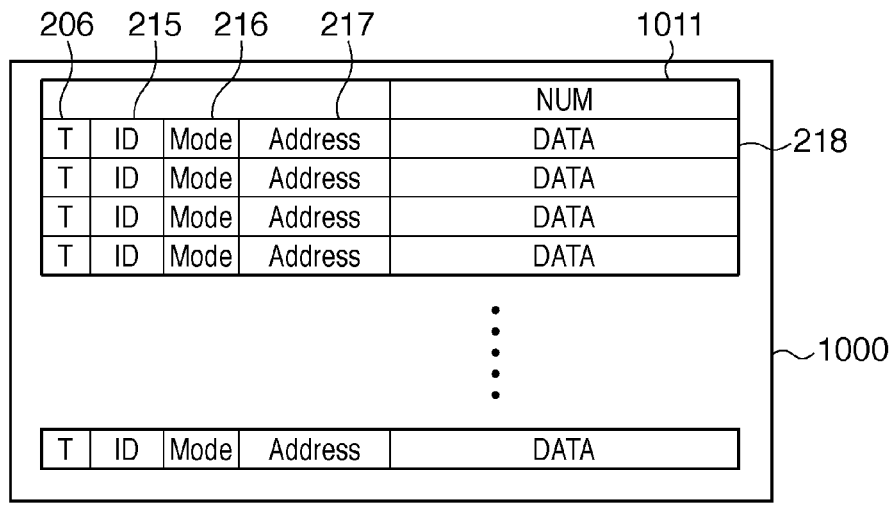
FIG. 8A is a view showing a format for freely specifying a setting method and address.
Figure 8B:
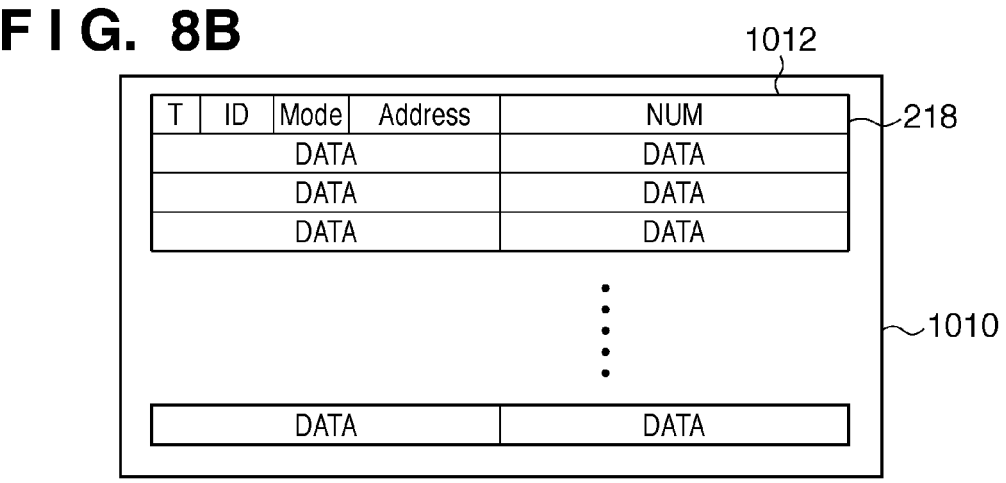
FIG. 8B is a view showing a format for setting initial values of a setting method and address.
Figure 8C:
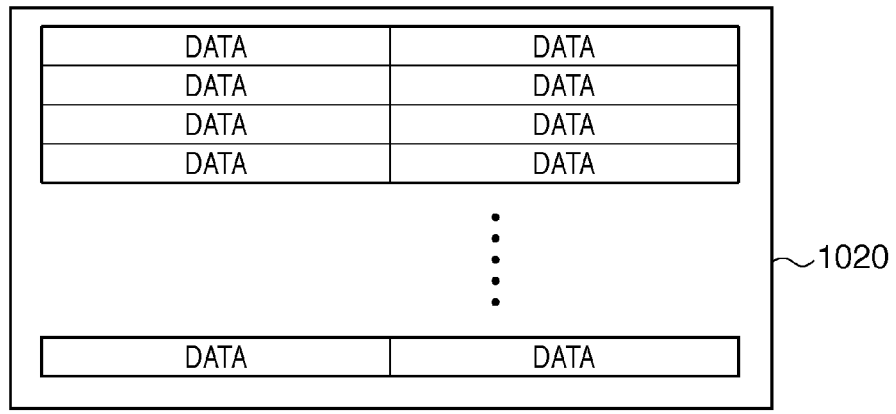
FIG. 8C is view showing a format for automatically giving a setting method and address in an input processing unit.

With reference to FIGS. 8A to 8C, an expansion example of a setting command loaded by the input processing unit 540 from an external memory will be explained. FIG. 8A shows a format example for explicitly expanding, for each data, the command type T field 206, MODE field 216, address field 217, and data field 218 in the system control unit 400.

The total number of expanded commands is specified by recording it in an NUM field 1011. The input processing unit 540 reads this, adds the valid flag 211, stall flag 212, connection ID 213, and count value 214 in the transmission unit 522, and outputs the result to the ring bus, thereby generating a setting command packet 210.

This format has an advantage of being able to randomly perform a write (W), read (R), or exchange (Ex) operation at an arbitrary address, and to flexibly control the information processing apparatus 420 by the system control unit 400.

FIG. 8B shows a format example for expanding the command type T field 206, setting destination module ID field 215, MODE field 216, and address field 217 in the system control unit 400 only once at first. Only data are sequentially expanded in the remaining area. The total number of the expanded data is specified by recording it in an NUM field 1012.

In this case, the input processing unit 540 formats the command packet while updating the MODE field 216 and address field 217 according to a certain rule. If, for example, the certain internal memory/register 605 has an extremely large number of entries, and all the entries are set, the size of a command expansion memory 1000 becomes very large in the method shown in FIG. 8A.

As shown in FIG. 8B, the initial value of an address is given in the beginning. Upon reading this value, the input processing unit 540 reads data the number of times indicated by the NUM field 1012, and adds an address incremented by 1 to each data. This enables to obtain the same output as in the case shown in FIG. 8A.

This format has an advantage that the command type T field 206, setting destination module ID field 215, MODE field 216, and address field 217 included in a command header portion need not be expanded on the memory for each data, as described above. This decreases the amount of the command expansion memory.

FIG. 8C shows a format example when the system control unit 400 only expands configuration data, and the input processing unit 540 or transmission unit 522 adds the whole command header portion.

In this case, the input processing unit 540 permanently holds, within itself, the values of the setting destination module ID field 215, MODE field 216, and address field 217 in advance, or is given, in advance, the values by a setting method different from that for a command. Using these pieces of information, while only data are read out, a command header portion is created, thereby performing output processing.

This format has an advantage that it is unnecessary to store extra command header information associated with transfer processing in an actual configuration data buffer, and it is possible to use the buffer as a data buffer in common with another software processing and the like.

With reference to FIG. 9, a flowchart illustrating a processing procedure according to the present invention will be described.

In step S1101, a command to be set is expanded on the RAM 403. An expansion format at this time is any one of the formats explained with reference to FIGS. 8A to 8C. In step S1102, the expanded command is searched. While discriminating which one of write (W), read (R), and exchange (Ex) modes is indicated by the contents of the MODE field 216, a command transfer rate is decided. As an execution result of this processing step, the setting value of the transmission interval timer 903 is decided.

In step S1103, the setting value of the transmission interval timer 903 decided in step S1102 is set. The value is set when the command is expanded in a command format or when an instruction is sent to the setting unit 560 by an additional setting method.

In step S1104, the information processing apparatus is instructed to start transferring the prepared command. In step S1105, end of processing is awaited. In step S1106, it is determined whether the processing is complete or not. If it is determined that the processing is not complete, the process returns to step S1105.

With reference to FIG. 10, a flowchart illustrating a search processing procedure associated with the command expansion format shown in FIG. 8A will be explained.

In step S1201, the start address of the command area expanded in step S1101 of FIG. 9 is set.

In step S1202, the number NUM 1011 of commands to be processed is read. In step S1203, an initial value is set to a packet input interval L, and an interval candidate K as an internal variable is initialized.

In step S1204, whether all commands have been searched is determined. If it is determined that all the commands have been searched (YES in step S1204), NUM=0 is discriminated to terminate the process; otherwise (NO in step S1204), the process advances to step S1205.

In step S1205, the MODE field 216 of a command written in a corresponding order is read. Whether the contents of the MODE field 216 indicate a write (W) mode is determined in step S1206. If it is determined to be a write (W) mode (YES in step S1206), the process advances to step S1207; otherwise (NO in step S1206), the process advances to step S1208.

In step S1207, the interval candidate K is set to 1 (the first interval).

In step S1208, whether the contents of the MODE field 216 indicate a read (R) mode is determined. If it is determined to be a read (R) mode (YES in step S1208), the process advances to step S1209; otherwise (NO in step S1208), the process advances to step S1210.

In step S1209, the interval candidate K is set to 2 (the second interval). In step S1210, whether the contents of the MODE field 216 indicate an exchange (Ex) mode is determined. If it is determined to be an exchange (Ex) mode (YES in step S1210), the process advances to step S1211; otherwise (NO in step S1210), the process advances to step S1212. In step S1211, the interval candidate K is set to 3 (the third interval). The second interval is longer than the first interval. Similarly, the third interval is longer than the second interval.

In this processing, the initial value of the interval candidate K is not updated in the loop process. This is because it is determined in succeeding processing that the largest value of K is recorded. For the sake of security, however, the initial value may be updated for each loop process.

In step S1212, if no command format is indicated, the interval candidate value K is set to a specific interval value M. This value may be, for example, an input interval in performing image processing. In general, the amount of processing contents of image processing is larger than that of contents of processing of simply setting a setting value, and may require a long processing time depending on a processor implementation method. In this case, it is necessary to input processing data packets more slowly than setting packets. A case in which a command format is unknown including a case in which the command type T field 206 indicates processing data may be addressed by using the processing interval M specified in advance.

In step S1213, whether the interval candidate K is longer than a packet input interval L is determined. If the interval candidate K is determined to be longer than the packet input interval L (YES in step S1213), the process advances to step S1214; otherwise (NO in step S1213), the process advances to step S1215.

In step S1214, the value of the packet input interval L is updated with the interval candidate K. Note that if the initial value of the packet input interval L is set to 0, the interval candidate K is determined to be longer than the packet input interval L (YES in step S1213), the process advances to step S1214. In this case, the process in step S1213 can be omitted. When, therefore, it is unnecessary to set a shortest transfer interval, for example, when there are no other data processes in progress, step S1213 may be omitted and step S1214 may be always executed.

In step S1215, in addition to subtracting 1 from the number of remaining commands, a read address is updated to the position of a command to be read out next. Then, the process returns to step S1204.

The initial value of the packet input interval L will be briefly described next. Consider, for example, a case in which processing of a module takes three or more cycles when processing image data instead of setting processing. In this case, when, for example, other data processes are in progress using modules different from each other on the same ring bus, it is necessary to input data other than setting commands, that is, processing data at an interval which has no influence on the data traffic on the ring bus. Assume, for example, that in other data flows in progress, data is input to the ring bus once in two cycles, and the data being processed uses 50% of the whole capacity of the ring bus. In this case, even if it is possible to input one command in one cycle at the maximum speed of command transfer, inputting commands to the ring bus at such speed may completely stop other data flows in progress. In some cases, this may cause a band overflow on the ring bus, thereby triggering a deadlock.

For this reason, since the initial value of the packet input interval L may vary depending on whether there exist other data flows in progress, this value is not explicitly specified here. If there are no other data flows in progress, the initial value can assume, for example, 1. If the operation speed (for example, the drive frequency) of a processing module is lower than that of the ring bus, the initial value may take a value obtained by multiplying the ratio between them.

In the case shown in FIG. 8B, only one piece of command header information existing at the beginning of the command area needs to be referred to. In this case, since all the succeeding data are processed in the same mode, an interval is commonly set for commands the number of which is represented by the NUM field 1012. The case shown in FIG. 8C is the same as that shown in FIG. 8B except that command header information additionally given is referred to.

Figure 11:
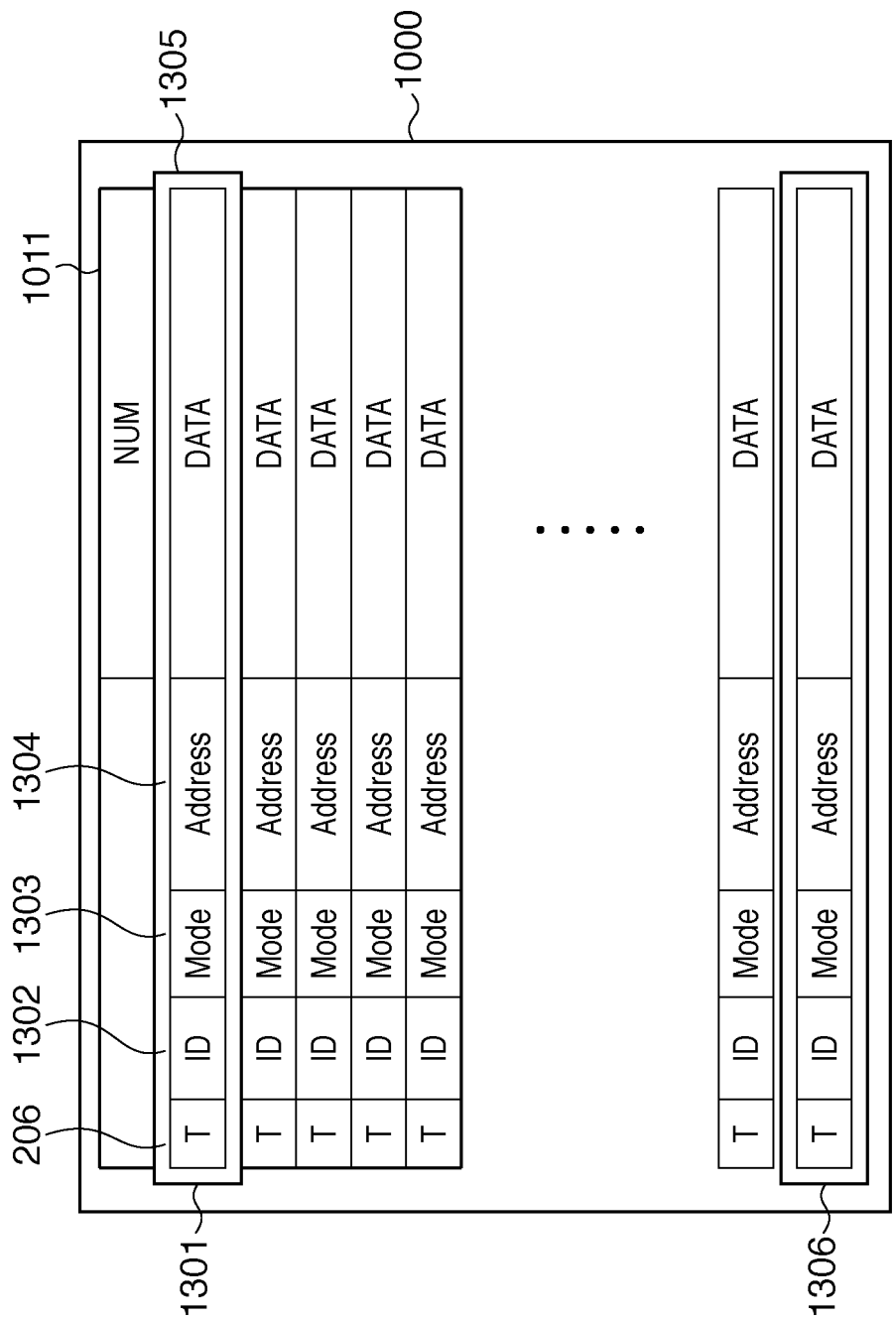
FIG. 11 is a view showing an arrangement example of transfer rate setting commands.

With reference to FIG. 11, an example of the transfer rate setting processing in step S1103 of FIG. 9 will be explained. In this case, the first command of a command sequence indicated by a command 1301 is inserted as a rate setting command. This rate setting command with a null DATA area 1305 may have been expanded in step S1101 in advance.

In the setting processing in step S1103, the transfer interval decided in step S1102 of FIG. 9 is written in the DATA area 1305. Note that an ID field 1302 indicates the input processing unit 540. A Mode field 1303 indicates a write (W) mode. An address field 1304 holds an address value in an internal memory or register for holding a transmission interval in the setting unit 560. The transmission interval timer 903 of the transmission unit 522 refers to the address field 1304.

The rate setting command indicated by the command 1301 enables to issue a command for setting a transfer rate prior to other setting commands, and to apply the rate decided in the interval decision processing in step S1102 to all other commands.

Making settings as shown here allows a setting method for each module within the information processing apparatus to be executed only by transfer of a command format. On the other hand, settings of module A for performing input/output processing may be made by being directly accessed from the system control unit 400. In this case, the rate setting command indicated by the command 1301 is omitted, and a transmission interval is set prior to sending a transfer execution instruction to module A.

Assume that after all the settings are made, processing of image data is subsequently performed. When command transfer is complete, it is necessary to reset the interval to a value in the image processing. A command 1306 for setting the interval in the image processing may be expanded at the end of the command sequence.

Figure 12:
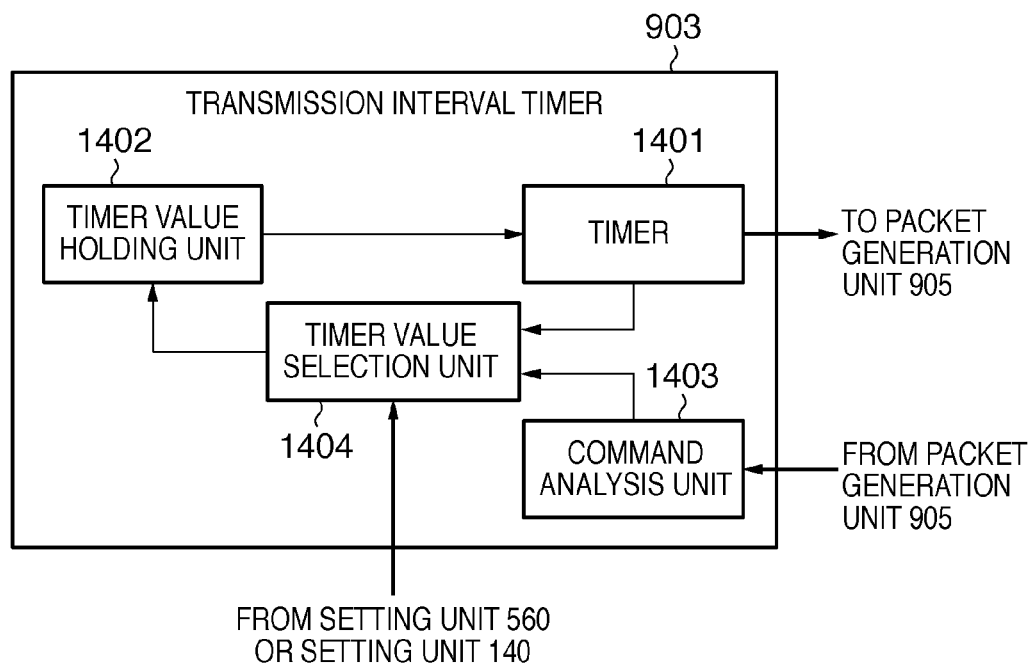
FIG. 12 is a block diagram showing a configuration example of a transmission interval timer for switching among a plurality of transmission intervals in accordance with a command type.

A configuration example of the transmission interval timer 903 shown in FIG. 12 will be described next. The transmission interval timer 903 includes a timer 1401, a timer value holding unit 1402, a command analysis unit 1403, and a timer value selection unit 1404.

The timer 1401 measures a transmission interval. The timer value holding unit 1402 holds a timer value. The command analysis unit 1403 analyzes a MODE field 216 of a command to be transmitted. According to an analysis result of the command analysis unit 1403, the timer value selection unit 1404 selects an appropriate timer value from a plurality of timer values held in the setting unit 560 or 140, and sets it in the timer value holding unit 1402.

The contents of the MODE field 216 of the command to be transmitted are input to the command analysis unit 1403. The command analysis unit 1403 then analyzes the contents to determine whether the command is a write (W), read (R), or exchange (Ex) command, and notifies the timer value selection unit 1404 of an analysis result.

Based on the analysis result of the command analysis unit 1403, the timer value selection unit 1404 selects one of an interval value Lw for a write (W) packet, an interval value LR for a read (R) packet, and an interval value LEx for an exchange (Ex) packet, which are held in advance in the setting unit 560 (setting unit 140). The selected value is set in the timer value holding unit 1402 in synchronism with the timing when the timer 1401 reaches a predetermined value to notify the packet generation unit 905 of transmission permission.

In performing, for example, a countdown operation, the timer 1401 may subtract 1 from the timer value held in the timer value holding unit 1402 in one cycle, and generate transmission permission when the timer value becomes 0. To the contrary, in counting up, the timer 1401 may increment an internally held count value by 1 by starting with an initial value 0, and generate a transmission permission when the count value reaches the timer value held in the timer value holding unit 1402. In the case of counting up, after generating transmission permission, the internal count value of the timer 1401 is initialized to 0 again.

This configuration eliminates the need for software to confirm a setting value by the dynamical search described above. Even if the different values of the MODE fields 216 are mixed in the command sequence in FIG. 8A, it is possible to automatically perform transmission for each command at an appropriate transmission interval.

The plurality of transmission interval values Lw, LR, and LEx are not externally referred to but may be permanently held within the transmission interval timer 903, as indicated by the signal 907. Note that if the ring bus is in a certain traffic condition due to other data flows in progress, it may not be always possible to appropriately control an interval. This method is, therefore, particularly effective for an information processing apparatus in which it is confirmed that only a single data flow is processed.

Assume that in data processing, a plurality of modules are involved in the processing and a processing speed is different for each module. Conventionally, it is necessary to consider an increase/decrease in processing speed and processing data amount for all the modules involved in the processing in order to correctly obtain a packet input interval. Since, however, a setting command only makes settings of a specific module, it is possible to control an input interval only in consideration of the contents of the MODE field 216.

Instead of searching a setting command expanded in advance to decide a packet input interval, while expanding a setting command, the command type T field 206 of the setting command may be always monitored to insert a command for switching a packet input interval as needed.

Figure 13:
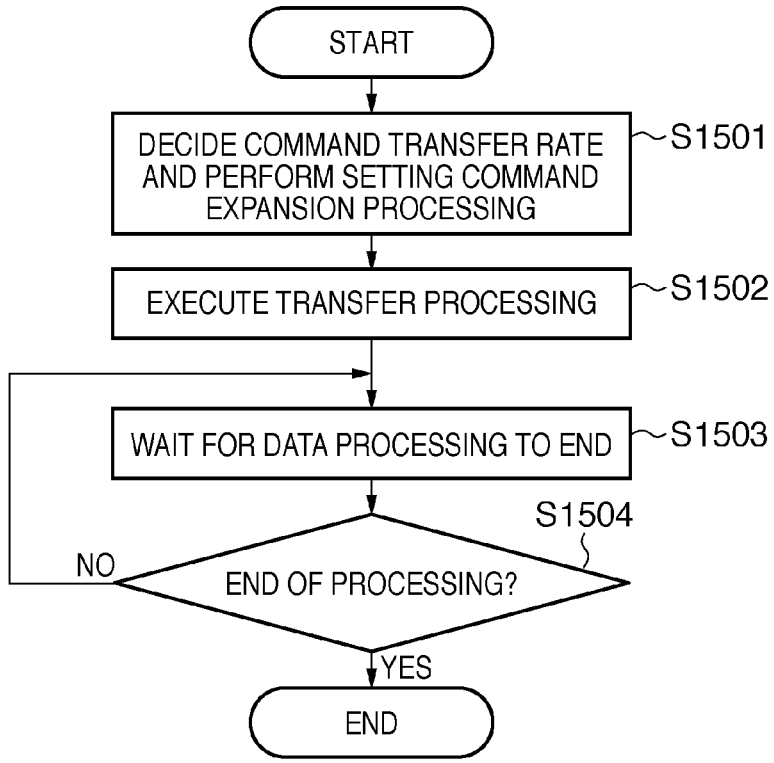
FIG. 13 is a flowchart illustrating a setting processing procedure in command expansion processing.

With reference to FIG. 13, a flowchart illustrating a processing procedure for inserting a command for switching a packet input interval as needed will be described.

In step S1501, while generating a command to be set, a transfer rate is decided in accordance with the contents of the MODE field 216, and the command is expanded on the RAM 403. An expansion format at this time is any one of the formats described with reference to FIGS. 8A to 8C.

In step S1502, the information processing apparatus is instructed to start transferring the prepared command. In step S1503, end of processing is awaited. In step S1504, the process returns to step S1503 until it is determined that the processing is complete.

Figure 14A:
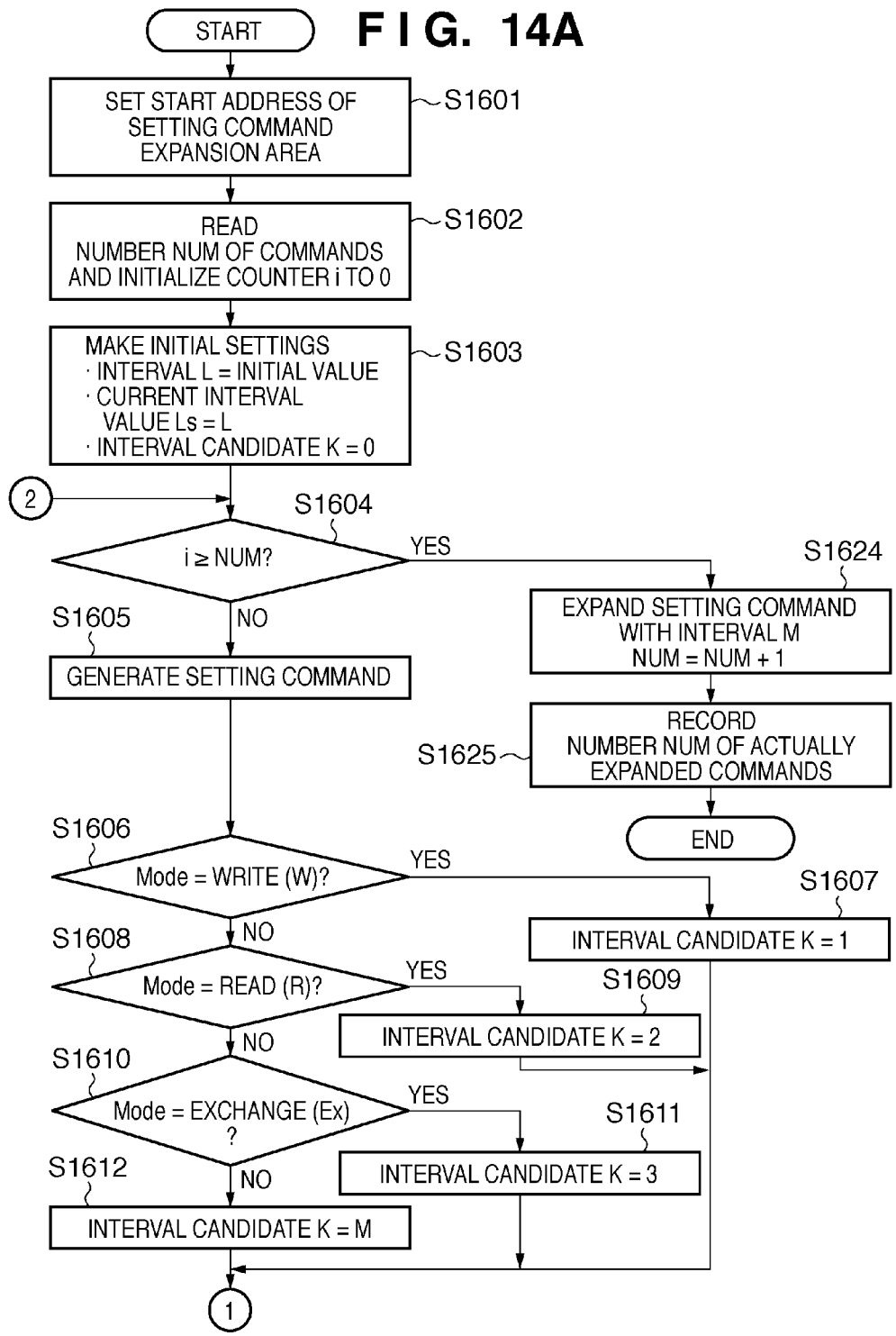

A flowchart in FIGS. 14A and 14B illustrating a command expansion processing procedure will be explained.

In step S1601, the start address of a memory area at which a command is to be expanded is set. In step S1602, the number of commands to be set is read into NUM, and a counter i is initialized to 0.

In step S1603, the initial value is set to the packet input interval L. A recorded value Ls of an interval set for an immediately preceding command held in the processing is set to L, and the interval candidate K as an interval variable is initialized to 0.

In step S1604, whether the counter i is equal to or larger than NUM is determined. With this determination, whether all the commands have been searched can be determined. If it is determined that the all the commands have been searched (YES in step S1604), the process advances to step S1624.

In step S1605, a command to be expanded is generated. In step S1606, whether the contents of the MODE field 216 indicate a write (W) mode is determined. If it is determined to be a write (W) mode (YES in step S1606), the process advances to step S1607; otherwise (NO in step S1606), the process advances to step S1608.

In step S1607, the interval candidate K is set to 1. In step S1608, whether the contents of the MODE field 216 indicate a read (R) mode is determined. If it is determined to be a read (R) mode (YES in step S1608), the process advances to step S1609; otherwise (NO in step S1608), the process advances to step S1610.

In step S1609, the interval candidate K is set to 2. In step S1610, whether the contents of the MODE field 216 indicate an exchange (Ex) mode is determined. If it is determined to be an exchange (Ex) mode (YES in step S1610), the process advances to step S1611; otherwise (NO in step S1610), the process advances to step S1612.

In step S1611, the interval candidate K is set to 3. In this processing, the initial value of the interval candidate K is not updated in the loop process. This is because it is determined in succeeding processing that the largest value of K is recorded. For the sake of security, the initial value may be updated for each loop process.

In step S1612, if no command format is indicated, the interval candidate value K is set to the specific interval value M. This value may be, for example, an input interval in performing image processing. In general, the amount of processing contents of image processing is larger than that of contents of processing of simply setting a setting value, and may require a long processing time depending on a processor implementation method. In this case, it is necessary to input processing data packets more slowly than setting packets. A case in which a command format is unknown including a case in which the command type T field 206 indicates processing data may be addressed by using the processing interval M specified in advance.

In step S1613, whether the interval candidate K is longer than the packet input interval L is determined. If the interval candidate K is determined to be longer than the packet input interval L (YES in step S1613), the process advances to step S1614; otherwise (NO in step S1613), the process advances to step S1618.

In step S1614, whether the interval candidate K is equal to the current interval value Ls is determined. If the interval candidate K is determined to be equal to the current interval value Ls (YES in step S1614), the process advances to step S1622; otherwise (NO in step S1614), the process advances to step S1615.

In step S1615, since it is necessary to change a transfer rate, the interval candidate K is set in the current interval value Ls. The process then advances to step S1616.

In step S1616, a command with an interval K is expanded. After that, the process advances to step S1617. In step S1617, NUM is incremented by 1, and a command expansion address is updated.

In step S1618, whether the current interval value Ls is equal to the packet input interval L is determined. If the current interval value Ls is determined to be equal to the packet input interval L (YES in step S1618), the process advances to step S1622; otherwise (NO in step S1618), the process advances to step S1619.

In step S1619, since it is necessary to change a transfer rate, the packet input interval L is set in the current interval value Ls. The process then advances to step S1620. In step S1620, a command with an interval L is expanded. After that, the process advances to step S1621.

In step S1621, NUM is incremented by 1, and the command expansion address is updated. In step S1622, the command generated in step S1605 is expanded.

In step S1623, 1 is subtracted from the number of remaining commands, and the address is updated with a next command expansion position. Then, the process returns to step S1604. In step S1624, a command for setting the interval M in image processing to be subsequently executed is expanded, and NUM is incremented by 1. Then, the process advances to step S1625.

In step S1625, the number NUM of all commands considering the number of interval setting commands is recorded on the area of the NUM field 1011 in FIG. 8A. Then, the process ends.

As described above, a transmission interval is determined with reference to the MODE field 216 for each command expanded in command expansion processing. When the same interval as an immediately preceding interval can be used, an interval setting command is not expanded. Only when a different interval is used, an interval setting command is expanded. This allows precise speed control for an arbitrary command sequence.

As a matter of course, in this processing, a large number of interval setting commands are expanded in a setting command sequence in which the value of the MODE field 216 often varies. By collecting and expanding commands having the same contents of the MODE field 216 as many as possible, it is possible to decrease the number of interval setting commands.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-183384 filed on Aug. 18, 2010, which is hereby incorporated by reference herein in its entirety.

What is claimed is:

1. An information processing apparatus which circulates a packet in one way among a plurality of modules connected in a ring shape, and transmits and receives the packet,
each of said plurality of modules comprising
a reception unit adapted to receive the packet,
a determination unit adapted to determine whether data contained in the packet received by said reception unit is processing data to be processed by a processing module of the module or configuration data for changing settings of the processing module by an internally contained command,
a discrimination unit adapted to, at least, discriminate, when said determination unit determines that the data contained in the packet is the configuration data, a command type indicating a type of command contained within the configuration data as a write mode in which the configuration data is written in the module, a read mode in which currently set configuration data held in the module is read out from the module, or an exchange mode in which the currently set configuration data is read out from the module, and then the configuration data is written in the module,
a decision unit adapted to decide a packet transmission interval from the module based on the command type discriminated by said discrimination unit,
a setting unit adapted to set, in a timer, the packet transmission interval decided by said decision unit, and
a transmission unit adapted to transmit the packet at the packet transmission interval set in the timer by said setting unit.

2. The apparatus according to claim 1, wherein
when said discrimination unit discriminates the command type as the write mode, said setting unit sets a first interval as the packet transmission interval,
when said discrimination unit discriminates the command type as the read mode, said setting unit sets a second interval longer than the first interval as the packet transmission interval, and
when said discrimination unit discriminates the command type as the exchange mode, said setting unit sets a third interval longer than the second interval as the packet transmission interval.

3. The apparatus according to claim 2, wherein
said decision unit decides the packet transmission interval based on the number of clocks, the second interval is longer than the first interval by one clock in terms of the number of clocks, and the third interval is longer than the second interval by one clock in terms of the number of clocks.

4. An information processing apparatus which circulates a packet in one way among a plurality of modules connected in a ring shape, and transmits and receives the packet,
each of said plurality of modules comprising
a reception unit adapted to receive the packet,
a determination unit adapted to determine whether data contained in the packet received by said reception unit is processing data to be processed by a processing module of the module or configuration data for changing settings of the processing module by an internally contained command,
a discrimination unit adapted to, at least, discriminate, when said determination unit determines that the data contained in the packet is the configuration data, a command type indicating a type of command contained within the configuration data as a write mode in which the configuration data is written in the module, a read mode in which currently set configuration data held in the module is read out from the module, or an exchange mode in which the currently set configuration data is read out from the module, and then the configuration data is written in the module,
a selection unit adapted to select, based on the command type discriminated by said discrimination unit, a packet transmission interval from the module, which has been set in advance for each command type,
a setting unit adapted to set, in a timer, the packet transmission interval selected by said selection unit, and
a transmission unit adapted to transmit the packet at the packet transmission interval set in the timer by said setting unit.

5. An information processing apparatus which circulates a packet in one way among a plurality of modules connected in a ring shape, wherein an input/output module of the plurality of modules comprises:
a setting unit adapted to set a timing of outputting a packet;
an output unit adapted to sequentially output
a first packet and a second packet for instructing memory access of at least one module of the plurality of modules having a memory, wherein a processing speed of the packet depends on the memory access,
wherein the setting unit sets the timing of outputting the second packet based on the first packet,
wherein the output unit outputs the second packet at the timing set by the setting unit.

6. An information processing method for circulating a packet in one way among a plurality of modules connected in a ring shape, and transmitting and receiving the packet, wherein
the method comprises in each of the plurality of modules
causing a reception unit to receive the packet,
causing a determination unit to determine whether data contained in the packet received in the causing the reception unit to receive is processing data to be processed by a processing module of the module or configuration data for changing settings of the processing module by an internally contained command,
causing a discrimination unit to, at least, discriminate, when the data contained in the packet is determined to be the configuration data in the causing the determination unit to determine, a command type indicating a type of command contained within the configuration data as a write mode in which the configuration data is written in the module, a read mode in which currently set configuration data held in the module is read out from the module, or an exchange mode in which the currently set configuration data is read out from the module, and then the configuration data is written in the module, causing a decision unit to decide a packet transmission interval from the module based on the command type discriminated in the causing the discrimination unit to discriminate, causing a setting unit to set, in a timer, the packet transmission interval decided in the causing the decision unit to decide, and causing a transmission unit to transmit the packet at the packet transmission interval set in the timer in the causing the setting unit to set.

7. An information method for circulating a packet in one way among a plurality of modules connected in a ring shape, and transmitting and receiving the packet, wherein the method comprises in each of the plurality of modules causing a reception unit to receive the packet, causing a determination unit to determine whether data contained in the packet received in the causing the reception unit to receive is processing data to be processed by a processing module of the module or configuration data for changing settings of the processing module by an internally contained command, causing a discrimination unit to, at least, discriminate, when the data contained in the packet is determined to be the configuration data in the causing the determination unit to determine, a command type indicating a type of the command contained within the configuration data as a write mode in which the configuration data is written in the module, a read mode in which currently set configuration data held in the module is read out from the module, or an exchange mode in which the currently set configuration data is read out from the module, and then the configuration data is written in the module, causing a selection unit to select, based on the command type discriminated in the causing the discrimination unit to discriminate, a packet transmission interval from the module, which has been set in advance for each command type, causing a setting unit to set, in a timer, the packet transmission interval selected in the causing the selection unit to select, and causing a transmission unit to transmit the packet at the packet transmission interval set in the timer in the causing the setting unit to set.

8. An information processing method for an information processing apparatus which circulates a packet in one way among a plurality of modules connected in a ring shape, the method comprising setting a timing of outputting a packet;

sequentially outputting a first packet and a second packet for instructing memory access of at least one module of the plurality of modules having a memory, wherein a processing speed of the packet depends on the memory access, wherein the setting sets the timing of outputting the second packet based on the first packet, wherein the sequentially outputting outputs the second packet at the timing set by the setting.

9. A non-transitory computer-readable storage medium storing a computer program which causes a computer to execute each step of an information processing method according to claim 6.

10. The apparatus according to claim 5 wherein the first packet and the second packet are each a setting command packet which sets at least one module of the plurality of modules.

11. The apparatus according to claim 10, wherein the setting command packet includes information indicative of a memory access type, wherein the setting unit sets the second packet at the timing based on the memory access type of the first packet.

12. The apparatus according to claim 10 wherein the setting command packet includes a setting processing mode, wherein the setting processing mode indicates a memory access type of a write, read, or exchange mode.

13. The apparatus according to claim 12, wherein the setting unit sets the timing of outputting the second packet after outputting the first packet so that the output interval between the second packet and the first packet becomes longest, in a case where the memory access type of the first packet represents the exchange mode.

* * * * *